Aug. 28, 1956        A. B. SKROMME        2,760,429
BALER NEEDLE DRIVE MEANS
Filed April 10, 1953        2 Sheets-Sheet 1
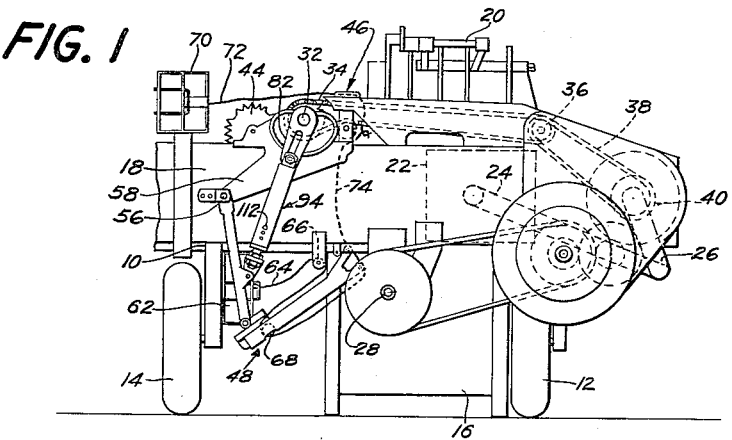
FIG. 1
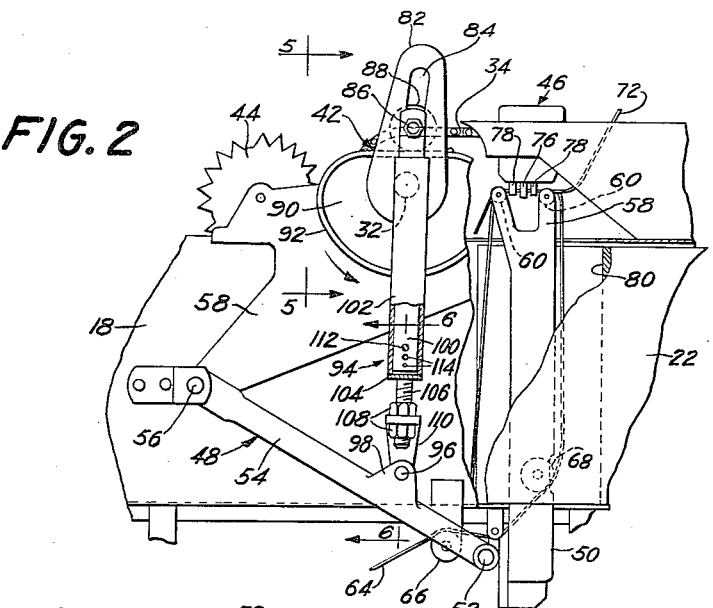
FIG. 2
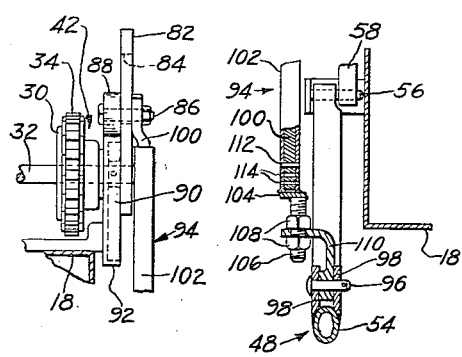
FIG. 5     FIG. 6
INVENTOR.
A.B. SKROMME
BY
ATTORNEYS Aug. 28, 1956  A. B. SKROMME  2,760,429
BALER NEEDLE DRIVE MEANS
Filed April 10, 1953  2 Sheets-Sheet 2

INVENTOR.
A. B. SKROMME
ATTORNEYS

United States Patent Office 2,760,429
Patented Aug. 28, 1956

2,760,429

BALER NEEDLE DRIVE MEANS

Arnold B. Skromme, Ottumwa, Iowa, assignor to Deere Manufacturing Co., Dubuque, Iowa, a corporation of Iowa Application April 10, 1953, Serial No. 347,941

10 Claims. (Cl. 100—19)

This invention relates to driving mechanism and more particularly to driving mechanism for a baler of the type used on farms for baling hay, straw, etc.

A typical baler of the character referred to comprises a mobile frame having pick-up means for picking up the hay, straw, etc. from the field and delivering it to an elongated bale chamber, the chamber having an opening in one side thereof through which the material is passed into the path of a reciprocating plunger. As each charge of hay is received by the plunger, it is compressed by the plunger into the accumulating bale and, after the bale has reached a predetermined size, a tying mechanism is energized to tie the completed bale. The usual tying mechanism, whether it uses wire, twine or other tying mechanism, includes at one side of the bale case suitable tying mechanism and at the other side a needle which moves across the bale case to the tying mechanism for carrying a strand of the tying medium about the end of the bale. The needle is, of course, normally idle while the bale is being accumulated and hence there can be no conflict between the plunger and the needle, but when the bale is completed the needle must move across part of the space in the bale chamber occupied by the plunger. The usual solution to the problem is to slot the plunger head so that the needle may move through this slot without causing damage. However, in many cases the material taken into the bale chamber will include foreign objects such as branches, rocks, fragments of fence posts and stumps and the like which will fall back from the completed but untied bale as the plunger recedes. Smaller objects are known to fall into and become lodged in the plungerhead slots. As the needle starts across the bale chamber, it will encounter this foreign object and its driving mechanism will be subjected to an overload. This alone may produce damage, but more important the needle becomes stopped in the path of the plunger on its next compression stroke. Since the plunger on that stroke will be carrying another charge of hay, the slots through which the needles normally pass will be obstructed, giving the plunger substantially a solid face, which can result only in extreme damage to the needles and associated parts.

It has heretofore been known to utilize shear pins etc. in the driving mechanism for the needle so that when the needle becomes obstructed and stops the driving mechanism can continue. Nevertheless, this is only a compromise, for the needle still remains in the path of the oncoming plunger and the most important source of damage is allowed to remain. According to the present invention, means is provided for positively driving the needle out of the path of the oncoming plunger, and this is one of the principal objects of the invention. Another important object of the invention is to incorporate such means along with an overload release means so that the needle-driving mechanism can be released upon an overload encountered by the needle, whereby the needle-driving mechanism may continue its complete cycle without the needle. As the needle-driving mechanism returns to starting position, the drive-out means becomes effective to drive the needle out of the path of the plunger. Further objects of the invention reside in the provision of a simple and effective design that may be economically added to balers of existing types, one that is foolproof in operation and requires little, if any, maintenance.

The foregoing and other desirable objects and important features inherent in and encompassed by the invention will become apparent as a preferred embodiment of the invention is disclosed in detail in the following specification and accompanying sheets of drawings in which Figure 1 is a rear view of a typical baler.

Figure 2 is a fragmentary rear view of an intermediate portion of the baler shown in Figure 1, drawn to an enlarged scale, and showing the needle in its advanced or tying position.

Figure 5 is a fragmentary sectional view as seen substantially along the line 5—5 of Figure 2.

Figure 6 is a fragmentary sectional view as seen substantially along the line 6—6 of Figure 2.

Figure 3:
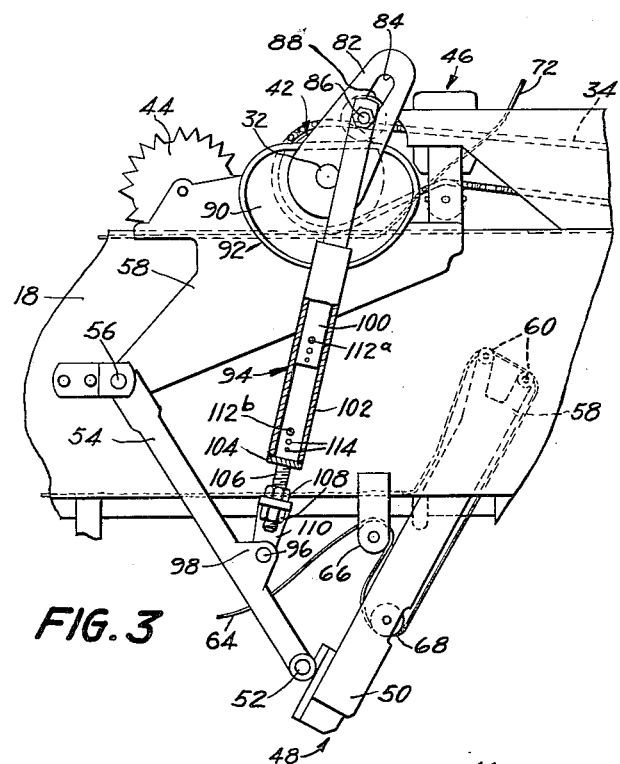
Figure 3 is a view similar to Figure 2 but showing an intermediate position of the needle with the drive linkage released.

The baler chosen for the purposes of illustration comprises a main frame 10 carried on right- and left-hand wheels 12 and 14 for advance over a field on which hay or other material to be baled has been previously cut and windrowed. This material is gathered from the field by conventional pick-up means and is fed to an elongated bale case 18 by means of any suitable feeding mechanism, such as represented generally by the numeral 20 in Figure 1. The baler illustrated may follow in general principles, although not in particular detail, that forming the subject matter of the U. S. patent to Hill 2,484,890. At any rate, the general design illustrated is fundamentally conventional and therefore need be only briefly described.

The opening through which the material is fed into the bale chamber 18 does not appear in the drawings but it can be readily visualized how this is achieved. As the material is fed into the bale chamber, it is encountered by a reciprocating member in the form of a plunger 22 which forces the material to the left, successive charges being added until a complete bale is formed, the length of the bale being the usual determining factor. The plunger is driven by a pitman 24 that is connected at its free end to a crankshaft 26 at the right-hand side of the baler. Here, as elsewhere throughout the specification, the expressions "right" and "left" are used with respect to the right- and left-hand sides of an observer standing behind the machine and looking forwardly.

The baler, as is conventional, may be drawn over the field by a tractor or other suitable source of draft power, which usually has a power take-off shaft (not shown) for transmitting power to a main input shaft, such as indicated at 28 here. Appropriate drive belting and gearing succeeds in transmitting driving power to the plunger crank-shaft 26 and thence to a tier sprocket 30 journaled on a tier shaft 32. Specifically, the means by which the tier shaft 32 is timed with the plunger includes a drive chain 34 trained about the tier sprocket 30 and about an intermediate sprocket 36. A second sprocket (not visible) rotatable with the intermediate sprocket 36 is driven by a chain 38 from a sprocket 40 on the plunger crankshaft 26. The driving means further includes a conventional one-revolution clutch 42 of the type illustrated in the U. S patent to Tuft 2,512,754, an expedient that is not uncommon in balers and binders and similar machines. Accordingly, it is only briefly referred to here.

As stated above, it is the length of the bale that determines when the bale is complete; that is, complete except for tying. In the present case, a conventional measuring wheel 44, after being rotated through one revolution by the accumulating bale, sets off a suitable trip mechanism (not shown) for energizing the one-revolution clutch 42. Such trip mechanism is also disclosed in the Tuft patent just mentioned. Up to this point, the tier sprocket 30 has been rotating relative to the fixed shaft 32, but when the one-revolution clutch is tripped or engaged, the sprocket 30 and shaft 32 rotate in unison through 360°, during which movement the tying of the bale is initiated and completed. During the tying operation, the plunger 22 continues to reciprocate (although in some balers not deemed important here, the drive to the plunger may be simultaneously disconnected).

The tying mechanism here illustrated comprises a wire tier, designated generally by the numeral 46, and one or more needles, designated generally by the numeral 48. Normally, there will be two needles but, since they will be of identical construction and will function identically, a description of only one will avoid duplication.

The needle 48 comprises a needle shank 50 fixed at 52 to a needle arm 54 to form somewhat of an L-shaped member. The free end of the needle arm 54 is pivoted at 56 on a transverse horizontal axis to a depending portion of a saddle casting 58 that embraces the upper portion of the bale case 18 from front to rear, in a manner forming the subject matter of the U. S. patent to Hill 2,558,250. Again, the details are not important. The needle 48 is thus mounted for movement in a cycle from a starting position shown in Figure 1 to a tying position shown in Figure 2 and return to the starting position of Figure 1.

The free end of the needle shank 50 is bifurcated at 58 (Figure 2) and each furcation journals a small sheave 60. The bottom of the bale case, adjacent the left-hand wheel 14, carries a wire box or other suitable container 62 within which is carried a coil of wire (not shown), and from which a strand of wire 64 extends to be trained about a sheave 66, journaled on the bale case, thence about a sheave 68, journaled on the needle shank 50 adjacent its connection at 52 to the needle arm 54, thence upwardly along the needle and about the sheaves 60 and then across the bale case 18 to the tying mechanism 46. A second wire box or container 70 is carried at an upper portion of the bale case 18, adjacent to its left-hand end, and contains a similar coil of wire (also not shown) from which a second strand of wire 72 is drawn. This second strand of wire is appropriately guided through the tying mechanism 46 and is joined to the free end of the lower wire 64 to stretch across the bale chamber as at 74 in Figure 1. The description so far, pertaining to the wire and the manner in which it is threaded through the tying mechanism 46 and needle 48, has proceeded on the assumption that the arrangement here is not unlike that in many types of conventional balers, but a certain amount of detail is deemed necessary for purposes of orientation.

As successive charges of hay. etc, are forced toward the left by the constantly reciprocating plunger 22, the bale will increase in length, moving along with it the wireportion 74 that extends across the bale chamber 18, additional wire as needed being drawn from the wire boxes 62 and 70. It will be understood in this respect, as indicated above, that tying with twine or other appropriate medium may involve the same problems described here. Accordingly, the expression "wire" is to be taken as illustrative and not limiting.

The measuring wheel 44 ultimately trips the one-revolution clutch 42 to initiate operation of the tying mechanism 46. Before a knot or tie can be formed in the wires to securely bind the bale just formed, the needle 48 must move from its position of Figure 1 to that of Figure 2, bringing with it the wire trained thereabout. This is best illustrated in Figure 2, wherein it will be seen that the wire 72 passes downwardly and then to the left through a twister member 76 and a pair of kinking members 78, all as set forth in the Tuft patent mentioned above. Preferably, the plunger head 22 includes as many needle-accommodating slots 80 as there are needles. Only one is shown here. As the plunger head 22 is on its compression stroke, the end of which is approximately at the location of the wire 74 in Figure 1, it has brought up the charge of hay that determines the end of that particular bale. Since the one-revolution clutch 42 is tripped because of action of the measuring wheel 44, the needle starts up through the guide slot 80 in the plunger, bringing a portion of the lower wire 64 up to meet the proximate portion of the upper wire 72. As the twist and kink are being formed, the plunger 22 is retracting, which is possible because the slot 80 is open at the left-hand end and there will be no interference with the needle in a normal state of affairs. After the tie or knot is formed, the wires are appropriately cut so that one loop of wire is bound around the completed bale and adjacent portions of the wires 64 and 72 are again joined so that a transverse portion of wire will occur again at 74 for the next bale. Before the plunger 22 returns with a charge of hay, the needle 48 must be retracted so that the needle shank 50 is out of the way of the plunger. The slot (or slots) 80 in the plunger are at this time ineffective to accommodate the needle, since the open ends of the slots will be covered by the next charge of hay, as suggested in Figure 4. This means that the needle must be out of the path of the plunger 22 if it is to avoid damage.

It will be seen from the foregoing that the timing of the plunger 22 and needle 48 is rather critical and that if anything should happen to upset this timing, considerable damage can result, particularly if the needle is caught in some midway position in the path of the loaded plunger 22 on its compression or advance stroke. This leads to a consideration of the driving mechanism between the needle 48 and the intermittently rotating shaft 32.

The shaft 32 has fixed to its outer end a needle-lift arm 82 in which is formed a slot 84 disposed radially as respects the axis of the shaft 32. A pin 86 carries a roller 88 and the pin is free to move along the slot 84 except as controlled by a fixed cam 90 having a peripheral cam track 92 which the roller 88 follows as the shaft 32 and arm 82 rotate in the direction of the indicating arrow.

The pin 86 serves also as the connecting means for the upper end of a force-transmitting link, designated generally by the numeral 94. The lower end of this link means is pivotally connected by a pin 96 to a pair of ears 98 formed integral with the needle arm 54.

Considered broadly and apart from the details to be described below, the link 94 establishes a driving or force-transmitting connection between the rotating driving member 32, 82 and the reciprocating or oscillating driven member or needle 48. When the one-revolution clutch 42 is energized, the normally idle shaft 32 is driven and the arm 82 swings in a counterclockwise direction as viewed in the drawings and exerts a tensional force through the link 94 to advance or raise the needle 48 to its tying position. Substantially one-third of a revolution of the shaft 32 is utilized to bring the needle to the tying position as shown in Figure 2. Because of the appreciable length of time that it takes to tie and kink the wires in the tying mechanism 46, the upper portion of the periphery 92 of the cam 90 is flattened to establish a dwell or rest period, so that as the arm 32 continues in the next third of its cycle movement the needle will not be immediately returned to its starting position but will remain at rest temporarily. As the driving member 32, 82 continues in its cycle, it will begin its last one-third revolution, during which phase of the cycle the needle 48 is normally returned to its position of Figure 1. In other words, the needle 48 is movable through a cycle from a starting position (Figure 1) to advance to a tying position (Figure 2) and is returned to its starting position as the tying operation is initiated and completed. Thus, part of the full cycle of the driving member 32, 82 will produce one-half of the cycle of the needle 48 (that is movement to the tying position) and another part of the cycle of the driving member 32, 82 will produce the retracting or return stroke of the needle 48. The details of the cam track and control just described form the subject matter of the U. S. patent to Hill 2,512,896.

As mentioned above, there are occurrences that cause the driving mechanism to depart from the norm. Most of the serious problems, at least those considered on the basis of the present invention, arise because of interruption of the needle 48 at some point in its advance stroke. The link means 94 is designed to eliminate these problems.

The link means 94 is relatively extensible and retractible, made so because it is constructed of an upper link part 100 and a lower link part 102. The upper link part is preferably telescopically received in the lower link part 102, which is tubular for that purpose. The lower link part has welded across its lower end an abutment plate 104 which closes that end of the link part and which has welded thereto a depending threaded rod 106 for connection by a pair of jam nuts 108 to a bracket 110. The bracket is in turn connected by the pin 96 to the needle arm 54.

The link parts 100 and 102 are interconnected by an overload release device, here in the form of a shear pin 112 passed through appropriately alined apertures in the link parts. Second and third sets of alined apertures respectively in the parts, such as designated by the numeral 114, may be provided to receive shear pins of different sizes, the other sets of apertures being of appropriately smaller sizes than the apertures that receive the shear pin 112. This provides means for adjusting the overload release device to accommodate different situations.

When the shear pin 112, for example, is in place to interconnect the parts 100 and 102, the parts are in their retracted or collapsed positions, thus giving the link means 94 its shortest length, apart from adjustment available by adjustment of the jam nuts 108. It will be assumed that the nuts 108 have been initially adjusted to select the proper length between the points 86 and 96 for the particular baler. The adjustment has no effect on the functioning of the overload release device. With the parts connected as just described, cyclic movement of the driving member 32, 82 will normally produce appropriate cyclic movement of the needle 48 and it is expected that the baling and tying operations will function without mishap.

Figure 3 illustrates a position of the needle 48 at which the needle has encountered some obstacle or obstruction in the bale case, which will occur on the advance or upstroke of the needle. The overload imposed on the link means 94 will be sufficient to cause the pin 112 to shear (112a and 112b) to permit the link means 94 to extend as the link parts 100 and 102 separate (also shown in Figure 3). This permits the shaft 32 and arm 82 (sometimes called the driving member) to continue movement through its cycle. Thus, overload imposed on the needle 48 will have no adverse effect on the needle-driving means comprising the components 32, 82, 42, etc.

Figure 4:
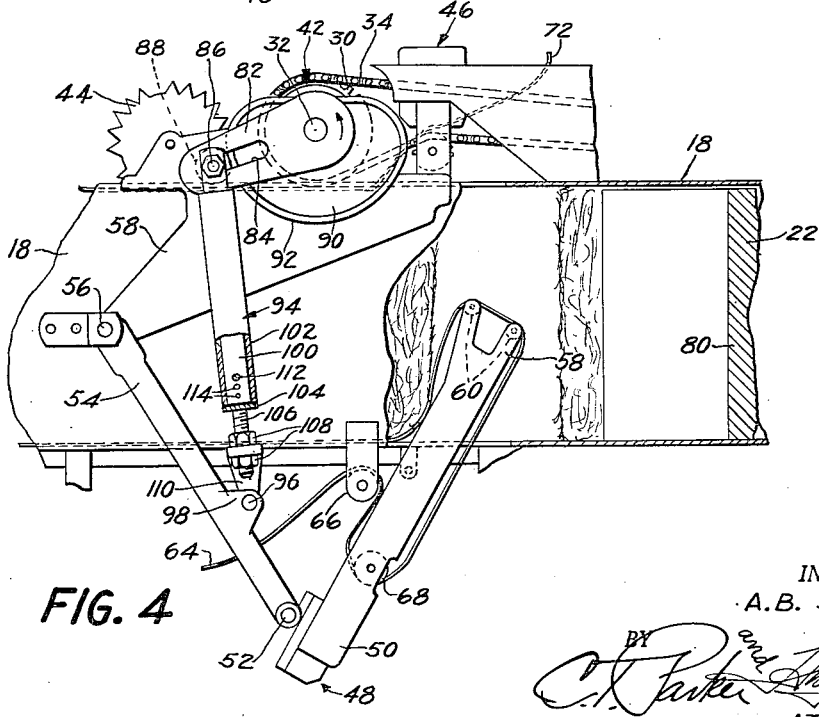
Figure 4 is a view similar to Figures 2 and 3 but showing the manner in which the drive linkage positively drives the needle out of the path of the plunger.

As will be recalled from the description above and as illustrated in Figure 4, the needle cannot remain in its interrupted position without being subjected to damage by the approaching plunger 22 with its next charge of hay, it being also recalled that this charge of hay will close the needle-accommodating slots 80. Therefore, unless some means is provided for driving the needle 48 out of the path of the plunger, the needle will be baled along with the succeeding charge of hay. According to the present invention, and also as illustrated in Figure 4, positive means is provided for this purpose. As the driving members 32, 82 returns on its second half-cycle or second half-revolution, the lower end of the upper link part 100 approaches the abutment plate 104 at the bottom of the lower tubular link part 102. Since the parts are telescopically arranged, they in effect include guide means for conditioning the parts for taking advantage of the transmission of force in compression about to occur as the stop means afforded by the lower end of the upper link part 100 engages the stop means afforded by the abutment plate 104 at the bottom of the tubular lower link part 102. Also, because the link parts are telescopically arranged, they cannot be completely separated, and thus are conditioned for reconnection, at least to the extent that the stop means just described effects a reconnection for the transmission of force in compression. Therefore, as the driving member 32, 82 nears the final phase of its second half-cycle or second half-revolution, the stop means become engaged and the link means 94 is effective in compression (even though the shear pin 112 has rendered it ineffective in tension) to drive the needle 48 out of the path of the oncoming plunger 22 and its accompanying charge of hay. Normally, it is expected that there will be no resistance to forcible retraction of the needle in this manner, since whatever obstruction is encountered by the needle will be met on the upstroke of the needle. The fact that this obstruction may remain in the path of the charged plunger is immaterial to the plunger, unless the obstacle is of such magnitude as to become important. If it is, appropriate slip clutch or shear pin means may be utilized in the plunger drive, all of which forms no part of the present invention.

The needle will, of course, become inoperative for subsequent transfer of wire to the tying mechanism 46 unless the shear pin 112 is replaced. If the operator is not otherwise aware of the condition that resulted in the shearing of the pin 112, he will soon become cognizant of that fact as the baler discharges untied material.

Various specific features of the invention not enumerated herein will undoubtedly occur to those versed in the art, as will many modifications and alterations in the preferred forms of the invention illustrated, all of which may be achieved without departing from the spirit and scope of the invention.

What is claimed is:

1. In a baler having a bale case in which a bale-forming plunger reciprocates, bale-tying means including a needle arranged for cyclic movement through the bale case and across the path of the plunger from a starting position at one side of the bale case to a tying position at the other side of the bale case and return, and a driven member movable in a cycle from a starting point and return and timed with the plunger to cause normally synchronized cyclic movement of the needle without conflict with the plunger, the improvement residing in force-transmitting link means for interconnecting the driving member and the needle, comprising: a driving link part connected to the driving member; a driven link part connected to the needle; a one-way overload release device interconnecting the link parts to afford a pitman of normally fixed length by means of which the driving member moving in its cycle normally moves the needle to its tying position and back to its starting position, said device being releasable upon abnormal stoppage of the needle only on its way to tying position so that the driving member causes the driving link part to leave and move away from the stopped driven link part and needle; said link means including guide means guiding the link parts against relative displacement transverse to the direction of separation so that the driving link part returns to the position at which it left the stopped driven link part as the driving member returns to its starting point; and said link means also including first and second one-way engageable positive stops additional to said device and fixed respectively to the link parts and normally positioned to prevent relative movement of the link parts only in the direction opposite to overload separation of said link parts, the stop on the driving link part moving away from the stop on the driven link part when the link parts separate upon release of the overload device and said stops positively interengaging upon return of the driving link part toward the stopped driven link part and thereby establishing between the link parts a positive driving connection independent of said device and effective to transmit force from the driving link part to the driven link parts in said opposite direction for forcibly moving the needle toward its starting position.

2. The invention defined in claim 1, in which: the parts are telescopic to effect said guide means.

3. The invention defined in claim 1, in which: one link part is tubular and the other link part is telescopically received therein; the tubular link part has rigidly mounted therein and crosswise thereof an abutment establishing one of said stops; and the proximate end of the received link part bottoms against the abutment and provides the other of said stops.

4. The invention defined in claim 1, in which: the overload release device comprises a shear pin interconnecting the link parts.

5. The invention defined in claim 1, in which: one link part has a rod connectible at one end to the needle and having an abutment plate fixed to and transversely across its other end; a tubular element secured to the abutment plate and extending away from said other end of the rod as a continuation of the rod; and the other link part is slidably received in the tubular element with one end thereof in proximity to the abutment plate and the other end thereof connectible to the driving member; the overload release device is releasable to permit relative telescoping of the links in the overload-release direction; the tubular part guides the link parts against relative transverse displacement and the abutment plate and the proximate end of the other link part effect said one-way-interengageable stops and prevent telescoping of the link parts in the opposite direction.

6. The invention defined in claim 5, in which: the overload release device comprises a shear pin shearable upon the occurrence of excessive force tending to extend the pitman but prevented from shearing upon the occurrence of forces tending to shorten the pitman because of the proximity of the abutment plate and the proximate end of the other link part.

7. The invention defined in claim 1, in which: the link parts are arranged for relative extension to enable elongation of the pitman upon release of the overload device; and the stop means are normally interengageable to prevent release of the overload device in response to forces tending to shorten the pitman.

8. In a baler having a bale case in which a bale-forming plunger reciprocates, bale-tying means including a needle arranged for cyclic movement through the bale case and across the path of the plunger from a starting position at one side of the bale case to a tying position at the other side of the bale case and return, and a driven member movable in a cycle from a starting point and return and timed with the plunger to cause normally synchronized cyclic movement of the needle without conflict with the plunger, the improvement residing in force-transmitting link means for interconnecting the driving member and the needle, comprising: a driving link part connected to the driving member; a driven link part connected to the needle; a one-way overload release device interconnecting the link parts to afford a pitman of normally fixed length by means of which the driving member moving in its cycle normally moves the needle to its tying position and back to its starting position, said device being releasable upon abnormal stoppage of the needle only on its way to tying position so that the driving member causes the driving link part to leave and move away from the stopped driven link part and needle; and said link means including one-way force-transmitting means additional to the aforesaid device and positively engageable between the driving member and the needle upon return of the driving member and driving link part in the direction of the stopped needle and driven link part to provide a positive driving connection independent of said device and effective to transmit force from the driving member to the needle member in said opposite direction for forcibly moving the stopped needle member toward its starting position.

9. In a baler having a driven member arranged for reciprocation to move normally in successive advance and return strokes from and to a starting position and a rotary driving member movable through 360°, the improvement residing in force-transmitting link means for interconnecting the two members, comprising: first and second link parts connected respectively to the driving and driven members; a one-way overload release device interconnecting the link parts so that the first half-revolution of the driving member normally produces the advance stroke of the driven member, said device being releasable upon abnormal stoppage of the driven member in its advance stroke and leaves and then returns to the stopped driven member so that the driving member continues to rotate; and means separate from the overload release device and operative between the members to establish a one-way positive force-transmitting connection independent of the release device and effective to drive the stopped driven member on its return stroke as the driving member rotates and returns to the stopped driven member in its second half-revolution.

10. In a baler having a driven member arranged for cyclic movement including successive advance and return phases and a driving member movable in a cycle from and return to a starting point, the improvement residing in force-transmitting link means for interconnecting the two members, comprising: first and second link parts connected respectively to the driving and driven member; an overload release device interconnecting the link parts so that the first half-cycle of the driving member normally produces the advance phases of the driven member, said device being releasable upon abnormal stoppage of the driven member in its advance phase so that the driving member leaves the stopped driven member and continues alone in its first half-cycle and begins its second half-cycle to return to said stopped driven member; and means separate from the overload release device and operative between the members to establish a positive force-transmitting connection independent of the release device and effective to move the stopped driven member in its return phase as the driving member completes its second half-cycle.

References Cited in the file of this patent

UNITED STATES PATENTS

| | | |
|---|---|---|
| 136,690 | Aufdembrinke | Mar. 11, 1873 |
| 872,498 | Cleveland | Dec. 3, 1907 |
| 1,384,270 | Murphy | July 12, 1921 |
| 2,327,946 | Ward | Aug. 24, 1943 |
| 2,512,896 | Hill et al. | June 27, 1950 |
| 2,516,642 | Murphy | July 25, 1950 |
| 2,604,844 | Hill | July 29, 1952 |

FOREIGN PATENTS

| | | |
|---|---|---|
| 451,561 | Germany | May 7, 1928 |